United States Patent [19]

Flynn, Jr. et al.

[11] Patent Number: 4,888,207
[45] Date of Patent: Dec. 19, 1989

[54] RECOVERY OF ARSENIC FROM ORES AND CONCENTRATES

[76] Inventors: Charles M. Flynn, Jr.; Thomas G. Carnahan, both of 1605 Evans Ave., Reno, Nev. 89512

[21] Appl. No.: 589,799

[22] Filed: Mar. 15, 1984

[51] Int. Cl.$^4$ .............................................. C01G 28/00
[52] U.S. Cl. ........................................ 423/87; 423/617
[58] Field of Search .................. 423/87, DIG. 2, 617; 75/121

[56] References Cited

U.S. PATENT DOCUMENTS

| | | | |
|---|---|---|---|
| 1,952,290 | 3/1934 | Shopper | 423/87 |
| 2,959,467 | 11/1960 | Yusuf | 423/87 |
| 4,220,670 | 9/1980 | Fugleberg et al. | 423/87 |
| 4,241,039 | 12/1980 | Koh et al. | 423/87 |
| 4,401,632 | 8/1983 | Madsen et al. | 423/87 |
| 4,438,079 | 3/1984 | Nakano et al. | 423/87 |
| 4,452,762 | 6/1984 | Fugleberg et al. | 423/87 |

FOREIGN PATENT DOCUMENTS

| | | | |
|---|---|---|---|
| 914647 | 3/1982 | U.S.S.R. | 423/87 |
| 2093003 | 8/1982 | United Kingdom | 423/87 |

*Primary Examiner*—Robert L. Stoll

[57] ABSTRACT

Arsenic, in the form of $As_2O_3$, is recovered from arsenical ores or concentrates by leaching with a hot acidic ferric salt solution to extract arsenic, followed by cooling the pregnant leach solution to crystallize $As_2O_3$. Leaching of some ores or concentrates is facilitated by addition of silver sulfate or mercuric sulfate to catalyze the leaching reaction.

5 Claims, No Drawings

RECOVERY OF ARSENIC FROM ORES AND CONCENTRATES

This invention relates to recovery of arsenic, in the form of $As_2O_3$, from arsenical ores and concentrates. Typical of such ores are arseno-pyrite, cobaltite, niccolite, enargite, and speiss. Concentrates of the ores are prepared by conventional means such as flotation.

Arsenic is conventionally recovered from its ores or concentrates by roasting them to produce arsenic trioxide, $As_2O_3$, which volatilizes and is subsequently condensed. Arsenic trioxide, however, poses serious problems by reason of its high toxicity, carcinogenicity and volatility. Hence, compliance with health and safety regulations is difficult or impossible to achieve on a regular basis with pyrometallurgical processes for treating the ores or concentrates. In the case of cobaltite, and other sulfur-containing arsenical ores or concentrates, $SO_2$, an objectionable pollutant, is also generated during roasting.

Hydrometallurgical processes have also been proposed for treatment of arsenical ores. In these, arsenic is commonly precipitated as an arsenate, and is then discarded. However, the arsenates are subject to weathering leaching by hydrolysis or by acidic or basic solutions, thereby causing water pollution problems.

U.S. Pat. No. 4,220,627 discloses a process for treatment of arsenic and metal-bearing raw materials to obtain an arsenic-free metal sulfate and a metal-free arsenic product. The process comprises leaching of the raw material with sulfuric acid under strong oxidizing conditions, obtained by addition of gaseous oxygen or air, at elevated temperature to form a sulfate solution containing both the metal and arsenic, the latter being in the $As^{5+}$ form. The resulting solution is cooled to selectively precipitate the metal in the form of sulfate. Recovery of the arsenic from the sulfate solution is then accomplished by extraction with butyl phosphate, or by reduction of the arsenic to arsenite, whereby $As_2O_3$ is precipitated.

U.S. Pat. No. 2,959,467 discloses an oxidation leach of metal values and arsenic from ores which also contain iron. The leach solution in this process consists of a combination of sulfuric and nitric acids, and the solutions are employed in a manner designed to adjust the ratio of iron to arsenic in the pregnant leach solution close to one.

It has now been found, according to the present invention, that arsenic may be recovered, in the form $As_2O_3$, from arsenical ores or concentrates by means of a process comprising leaching of the ore or concentrate with a hot acidic ferric salt solution, followed by cooling of the leach solution to precipitate $As_2O_3$. Thus, most of the arsenic may be recovered as $As_2O_3$, without the necessity of a reduction step.

The preferred leach solution comprises an aqueous solution of ferric sulfate and sulfuric acid, since this solution is economical, provides a high recovery of $As_2O_3$, and does not result in formation of gaseous reaction products. Other leach solutions, such as ferric chloride or nitrate in solutions of the corresponding acid, may, however, be used in the process of the invention.

The leach solution preferably contains a maximum concentration of ferric salt, generally about 200 g/l or higher. Suitable acid concentrations are about 20 to 500 g/l, with about 400 to 450 g/l generally being preferred. The preferred ratio of ferric salt to arsenic ore or concentrate is the stoichiometric amount necessary to solubilize the arsenic. Excess ferric salt is generally undesirable since it is liable to oxidize the arsenic to arsenate at an undesirably high rate.

Certain arsenical minerals, such as enargite, however, leach slowly even at boiling temperature. It has been found that such minerals may be effectively treated by the process of the invention if silver or mercury salts, particularly the sulfates, are added to catalyze the leaching reaction. Silver sulfate is generally most effective, and is employed in amounts of about 0.05 to 0.5 g/l of leach solution, with mercuric sulfate being used in amounts of about 1 to 5 g/l.

In addition, ores containing significant percentages of valueless minerals reactive to the leach solution may require a preleach with a dilute acid to remove them. An important consideration is the removal of calcium minerals to avoid contamination of the product $As_2O_3$ by coprecipitated gypsum. The minimum calcium content of the ore requiring such a preleach depends on the Ca/Fe ratio in the ore and the leaching reagent requirements of the ore. To avoid gypsum precipitation, calcium concentrations in the leach liquors should not exceed 0.5 g Ca/l. Any strong mineral acid is acceptable for preleaching although hydrochloric acid is preferred because chloride salts are usually very soluble. The preferred preleach temperature is 20°–40° C.

The preferred leaching temperature in the process of the invention is about 100° to 120° C., the boiling point of the leach solution, depending on the ferric salt and acid employed, and their concentrations. At lower temperatures the leaching rate is too low, whereas at temperatures above 150° C. the solubility of the ferric salt decreases greatly. Preferred pressure is atmospheric, except at temperature above 100° to 120° C., where pressurization may be required to prevent loss of water from the reaction mixture. Solution arsenic trioxide concentrations exceeding 15 g/l can be obtained in the leaching reaction.

Following leaching, the leach solution is filtered hot to remove remaining solids, and is then cooled to crystallize the $As_2O_3$. Crystallized $As_2O_3$ is recovered by filtration and washing. Generally, the lower the final temperature during crystallization, the greater the recovery of $As_2O_3$. Ambient temperature, i.e., about 15° to 35° C., is preferred because no refrigeration is required. The most likely cocrystallizing salts are ferrous salts, such as ferrous sulfate, which can generally be readily removed during washing of the $As_2O_3$. However, it is usually possible to adjust the acid concentration of the pregnant leach solution so as to prevent cocrystallization of ferrous salts. Furthermore, much of the byproduct ferrous salts precipitate during leaching and are removed in the hot filtration when the acid concentration of the leach solution is sufficiently high, e.g., about 30 pct or higher in the case of sulfuric acid. For example, a solvent composition of about 30 to 37 pct sulfuric acid will result in crystallization of $As_2O_3$ free of ferrous sulfate at 25° C.

A minor portion of the arsenic that is solubilized in the acid-ferric salt leach is present as $As^{5+}$, i.e. as arsenate. This arsenate must be reduced to $As^{3+}$ before it can be recovered from the solution as $As_2O_3$. Accordingly, reduction of any $As^{5+}$ to $As^{3+}$ is required for maximum recovery of arsenic. This may be accomplished by treatment of the hot pregnant leach solution with a conventional reducing agent, such as $SO_2$.

The crystallized $As_2O_3$ can be purified if necessary by recrystallization from water or dilute acid. However, if much calcium is present in the ore, some of it will co-crystallize as gypsum during crystallization of the $As_2O_3$, and is difficult to remove by recrystallizing. Hence, calcium should be removed from the ore by means of a preleach with dilute acid, as discussed above.

The leach solution contains other metal values, such as Co, Ni and Cu in addition to arsenic. These metals can be recovered by conventional techniques such as electrolysis, cementation, solvent extraction-electrolysis, or hydrogen reduction, after arsenic removal. If salts of valuable metals, such as Co, Ni, and Cu, remain in the leach residue, the residue is water leached, and this solution is combined with the filtrate from $As_2O_3$ crystallization prior to recovery of the metals by the above-mentioned conventional means. The solution is bled to control iron buildup, the barren solution, after removal of valuable metals, being oxidized by conventional techniques, such as with air or oxygen, to regenerate the iron salt, and the solution may be recycled for further leaching.

The invention will be more specifically illustrated by the following examples.

EXAMPLE 1

Weighed amounts of ore concentrates were boiled with solutions composed of 80 grams anhydrous $Fe_2(SO_4)_3$ and 318 grams of 30.8 pct aqueous $H_2SO_4$ for 6 hours. During this leaching period, the volumes of the solutions, initially about 280 ml, were allowed to decrease to about 220 ml, corresponding to a solvent composition of about 37 pct $H_2SO_4$, by evaporation of water. Water lost beyond that amount was replaced. At completion of the leaching, the slurries were filtered while hot to separate leach residues and precipitated sulfate salts from the pregnant solution. The filter cakes were washed with 10 to 20 ml of water, which was added to the filtrates. The filtrates were cooled, during which $As_2O_3$ crystallized. The products were separated by filtration, washed with water and air dried. The water washing removed soluble cocrystallized sulfate salts, with the exception of gypsum.

The leaching residue filter cakes from the hot filtration were stirred with dilute $H_2SO_4$ to dissolve soluble salts. The slurries were filtered, and the solids and solutions were analyzed, as were the arsenic trioxide products and the filtrates from the arsenic trioxide crystallizations. The results of leaching four different arsenic feeds are presented in table 1. The arsenic trioxide products contained <0.1 pct Fe and <0.01 pct Co or Cu.

The procedure was very effective for leaching cobaltite and speiss, partially effective for arsenopyrite and ineffective for enargite. The purity of the crystallized $As_2O_3$ was 98 pct or higher in the three tests where $As_2O_3$ was crystallized. Gypsum was the major impurity in all of the arsenic trioxide products.

TABLE 1

| | Ore concentrate | | | |
|---|---|---|---|---|
| | Arseno-pyrite | Cobalite | Speiss | Enargite |
| Feed | | | | |
| Total, g | 14.0 | 20.0 | 17.0 | 16.0 |
| As, g | 6.8 | 8.6 | 7.4 | 3.3 |
| Fe, g | 3.3 | 1.9 | 2.2 | .5 |
| Water insoluble leach residue | | | | |
| Total, g | 7.5 | 4.8 | 5.2 | 14.8 |
| As, g | 3.5 | .4 | .8 | 3.1 |
| Fe, g | 2.1 | .1 | .3 | .2 |
| Water soluble sulfate salts in hot filtration filter cake | | | | |
| As, g | .1 | .8 | .5 | — |
| Fe, g | 11.2 | 15.6 | 18.0 | — |
| $As_2O_3$ crystals | | | | |
| As, g | 2.0 | 3.7 | 3.3 | — |
| Filtrate from $As_2O_3$ crystallization | | | | |
| As, g | 1.2 | 3.7 | 2.8 | .2 |
| Fe, g | 12.3 | 9.5 | 6.2 | 22.6 |
| Pct As extraction | 51 | 95 | 89 | 9 |
| Pct As recovery as $As_2O_3$ | 29 | 43 | 45 | 0 |
| Pct purity of $As_2O_3$ crystals | 99 | 99 | 98 | — |
| Pct arsenate formed | <1 | 33 | 14 | — |
| Associated metals, M | Co | Co | Co | Cu |
| Pct M extraction | 70 | 90 | 90 | 8 |
| Pct M in sulfate salts | 20 | 40 | 40 | 0 |
| Pct Fe eliminated in sulfate salts | 52 | 65 | 75 | 0 |

EXAMPLE 2

The feed materials, arsenopyrite and enargite, that did not leach well in the experiments of example 1 were further tested. The procedure was the same as for example 1 except that 250 mg of $Ag_2SO_4$/l or 1,200 mg of $HgSO_4$/l were added to the leaching solutions. The leaching results are shown in table 2.

TABLE 2

| | | Percent extraction | | |
|---|---|---|---|---|
| | Feed | As | Cu | Co |
| No additive | Enargite | 9 | 8 | — |
| 250 mg $Ag_2SO_4$/l added | Enargite | 97 | 94 | — |
| 1,200 mg $HgSO_4$/l added | Enargite | 47 | 45 | — |
| No additive | Arsenopyrite | 51 | — | 70 |
| 250 mg $Ag_2SO_4$/l added | Arsenopyrite | 71 | — | 80 |

Table 2 shows that the addition of $Ag_2SO_4$ is very effective for improving the leaching of arsenic and the associated base metals from these feed materials. The addition of $HgSO_4$ to the leaching solution was intermediate in effectiveness between no additive and the $Ag_2SO_4$ additive. Neither leaching solution additive had any effect on the recovery or the purity of the $As_2O_3$ crystals. Both leaching solution additives remained in the filtrate and could be reused for leaching fresh ore concentrate.

EXAMPLE 3

Cobaltite, the ore with which the most arsenate was formed or was present as such initially, was leached as in example 1 except that the weights of reagents were doubled and the weight of cobaltite was 48.0 grams. The leaching reaction was run 5 hours, then the hot filtration was done. The hot pregnant leach solution was split in halves. One half was allowed to cool in air to crystallize the $As_2O_3$. The second half of the solution was put into a pressure bottle and treated with $SO_2$ at 25 to 30 psig during cooling. The solution, initially at 66° C., cooled to 28° C. in 2.0 hours during this $SO_2$ treatment. The $SO_2$ was then removed from the cooled mixture by aeration. The $As_2O_3$ was isolated from the $SO_2$-treated and untreated solutions and the solutions were analyzed as in example 1. The results showed that about 65 pct of the arsenate was reduced to $As_2O_3$ by the $SO_2$. This conversion could likely be improved by starting $SO_2$ treatment at a higher temperature, using a higher $SO_2$ pressure, or by cooling the solution more slowly. The $As_2O_3$ formed from arsenate in the $SO_2$ reduction appears as an increased recovery of $As_2O_3$ crystals. This test was conducted with about 15 pct excess ore, and it also showed that arsenate in the solution is not reduced at a significant rate to $As_2O_3$ by excess ore.

We claim:

1. A process for recovery of arsenic, as $As_2O_3$, from arsenical sulfide ores or concentrates comprising:
   (a) leaching of the ores or concentrates with an acidic ferric compound-containing leach solution at a temperature of 100° to 150° C. to extract arsenic in the $As^{3+}$ state, wherein the acidic ferric compound is selected from the class consisting of ferric sulfate and sulfuric acid, ferric nitrate and nitric acid, and ferric chloride and hydrochloric acid, and wherein said leach solution additionally contains a leaching catalyst selected from the class consisting of silver sulfate and mercuric sulfate;
   (b) separating the pregnant leach solution from the leach residue, and
   (c) cooling the pregnant leach solution to crystallize $As_2O_3$.

2. The process of claim 1 in which the temperature of the leach solution in step (a) is about 100° C. to 120° C.

3. The process of claim 1 in which the $As_2O_3$ is crystallized by cooling the pregnant leach solution to about 15° to 35° C.

4. The process of claim 1 wherein when the ores or concentrates contain calcium, they are treated with dilute acid to remove calcium prior to the leaching step with the ferric compound-containing leach solution.

5. The process of claim 1 wherein after step (b) including the additional step of treatment of the pregnant leach solution with $SO_2$ to reduce any pentavalent arsenic to trivalent arsenic prior to crystallization of $As_2O_3$.

* * * * *